US009028006B2

(12) United States Patent
Yi et al.

(10) Patent No.: US 9,028,006 B2
(45) Date of Patent: May 12, 2015

(54) SAFETY BOW ASSEMBLY AND CHILD SEAT INCLUDING THE SAME

(71) Applicant: Wonderland Nurserygoods Company Limited, Central (HK)

(72) Inventors: Ze-Hua Yi, Guangdong (CN); Zhi-Ren Zhong, Guangdong (CN)

(73) Assignee: Wonderland Nurserygoods Company Limited, Central (HK)

( * ) Notice: Subject to any disclaimer, the term of this patent is extended or adjusted under 35 U.S.C. 154(b) by 15 days.

(21) Appl. No.: 13/941,659

(22) Filed: Jul. 15, 2013

(65) Prior Publication Data

US 2014/0015300 A1    Jan. 16, 2014

(30) Foreign Application Priority Data

Jul. 16, 2012    (CN) ...................... 2012 2 0343881 U

(51) Int. Cl.
  *A47D 1/00*    (2006.01)
  *B60N 2/28*    (2006.01)
  *A47D 15/00*    (2006.01)

(52) U.S. Cl.
  CPC ................ *A47D 1/00* (2013.01); *B60N 2/2839* (2013.01); *B60N 2/2866* (2013.01); *A47D 15/006* (2013.01)

(58) Field of Classification Search
  CPC ..... A47D 1/00; A47D 15/006; B60N 2/2839; B60N 2/2866
  USPC ................................ 297/487, 148; 280/47.38
  See application file for complete search history.

(56) References Cited

U.S. PATENT DOCUMENTS

| 6,513,827 | B1 * | 2/2003 | Barenbrug | 280/648 |
| 6,793,292 | B2 * | 9/2004 | Lan | 297/487 |
| 7,377,537 | B2 * | 5/2008 | Li | 280/650 |
| 7,854,482 | B2 * | 12/2010 | Chen et al. | 297/487 |
| 8,469,388 | B2 * | 6/2013 | Moore | 280/642 |
| 8,523,218 | B2 * | 9/2013 | Doucette et al. | 280/642 |

* cited by examiner

*Primary Examiner* — Sarah B McPartlin
(74) *Attorney, Agent, or Firm* — Ladas & Parry LLP

(57) ABSTRACT

A safety bow assembly for a child seat comprises: a bow body that has opposite first and second ends; first and second connecting parts that are connected to the child seat, the first connecting part defining an accommodating space and having a side wall; and an engaging lever that is connected movably to the side wall, that is formed with an engaging element facing the accommodating space, and that is movable relative to the side wall between a first position, in which the engaging element is adapted to engage releasably a coupling part of the child seat, and a second position, in which the engaging element is adapted to be disengaged from the coupling part.

9 Claims, 8 Drawing Sheets

SAFETY BOW ASSEMBLY AND CHILD SEAT INCLUDING THE SAME

CROSS-REFERENCE TO RELATED APPLICATION

This application claims priority of Chinese Application No. 201220343881.3, filed on Jul. 16, 2012.

BACKGROUND OF THE INVENTION

1. Field of the Invention

This invention relates to a safety bow assembly and a child seat including the same, more particularly to a safety bow assembly having a bow body and two connecting parts pivoted to the bow body and slidably engaging a seat body of the child seat.

2. Description of the Related Art

Conventional child seats normally use a block system, such as a safety bow, a safety crossbar, a safety harness and a strap, to prevent a child sitting on the child seat from falling out. U.S. Pat. No. 6,736,455 discloses a conventional child seat including a seat body and upper and lower crossbars that are pivoted to the seat body and that are lockable so as to be positioned at desired positions relative to the seat body. When a child is to be removed from the seat body, the lower crossbar is unlocked and is rotated downward by a person. However, it often happens that the lower crossbar cannot pass over the legs of the child sitting on the seat body when being rotated downward, leaving a small gap between the seat body and the lower crossbar with the legs of the child remained therein, which, in turn, results in inconvenience in moving the legs of the child out of the gap.

SUMMARY OF THE INVENTION

Therefore, an object of the present invention is to provide a safety bow assembly for a child seat that can overcome the aforesaid drawback associated with the prior art.

Another object of the present invention is to provide a child seat including the safety bow assembly. According to one aspect of this invention, there is provided a safety bow assembly for a child seat having first and second coupling parts. The safety bow assembly comprises: a bow body that has opposite first and second ends; first and second connecting parts that are adapted to be respectively connected to the first and second coupling parts of the child seat, the first connecting part defining an accommodating space and having a first side wall, the accommodating space being adapted to receive removably the first coupling part therein, the first side wall being formed with an opening that is in spatial communication with the accommodating space; and an engaging lever that extends from a periphery of the opening into the opening, that has a free end, that is formed with an engaging element facing the accommodating space, and that is resiliently bendable so as to be movable relative to the first side wall between a first position, in which the free end of the engaging lever is disposed in the opening and in which the engaging element is adapted to engage releasably the first coupling part, and a second position, in which the free end of the engaging ever is disposed outwardly of the opening and in which the engaging element is adapted to be disengaged from the first coupling part, such that the connection between the first connecting part and the first coupling part is detachable.

According to another aspect of this invention, there is provided a child seat that comprises a seat body and a safety bow assembly. The seat body has first and second armrests and first and second coupling parts which protrude respectively from the first and second armrests and which are opposite to each other in a transverse direction. The safety bow assembly includes: a bow body that has opposite first and second ends; first and second connecting parts that are respectively connected to the first and second coupling parts of the child seat, the first and second connecting parts being respectively pivoted to the first and second ends of the bow body so as to be rotatable relative to the bow body, the first connecting part defining an accommodating space and having a first side wall, the accommodating space receiving removably the first coupling part therein, the first side wall being formed with an opening that is in spatial communication with the accommodating space; and an engaging lever that extends from a periphery of the opening into the opening, that has a free end, that is formed with an engaging element facing the accommodating space, and that is resiliently bendable so as to be movable relative to the first side wall between a first position, in which the free end of the engaging lever is disposed in the opening and in which the engaging element engages releasably the first coupling part, and a second position, in which the free end of the engaging lever is disposed outwardly of the opening and in which the engaging element is disengaged from the first coupling part, such that the connection between the first connecting part and the first coupling part is detachable.

BRIEF DESCRIPTION OF THE DRAWINGS

In drawings which illustrate an embodiment of the invention.

DETAILED DESCRIPTION OF THE PREFERRED EMBODIMENT

Figure 1:
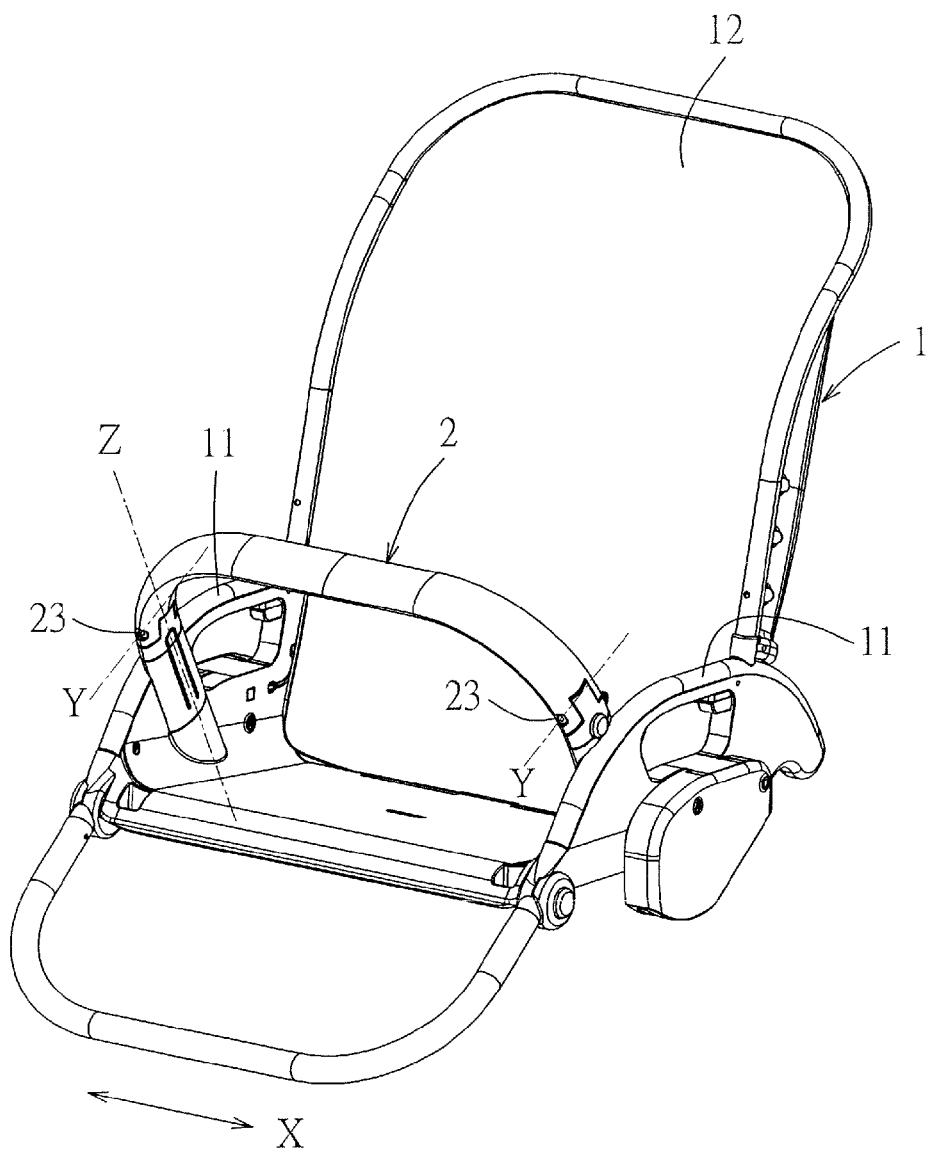
FIG. 1 is a perspective view of the preferred embodiment of a child seat according to the present invention.
Figure 2:
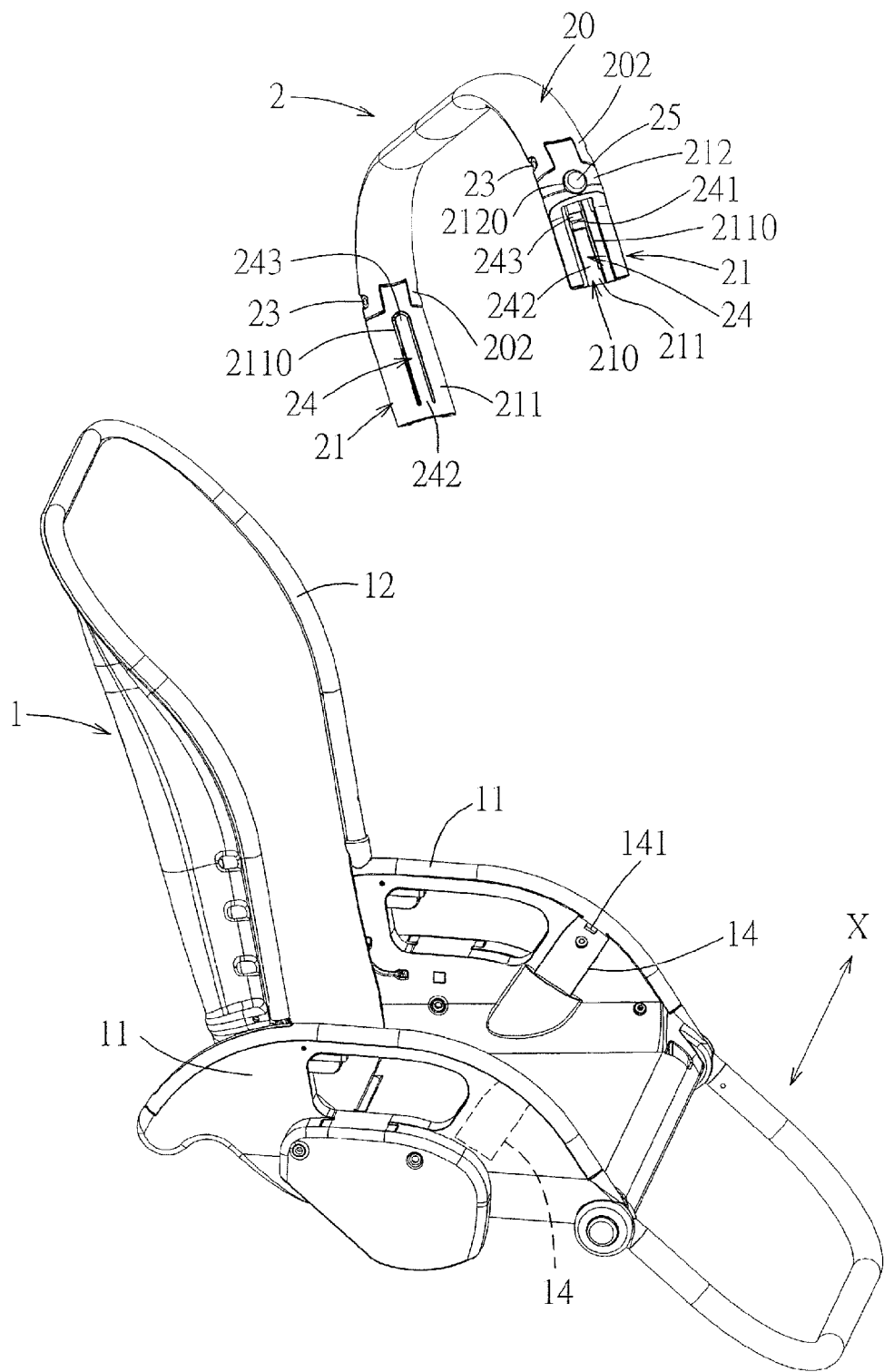
FIG. 2 is an exploded perspective view of the preferred embodiment.
Figure 3:
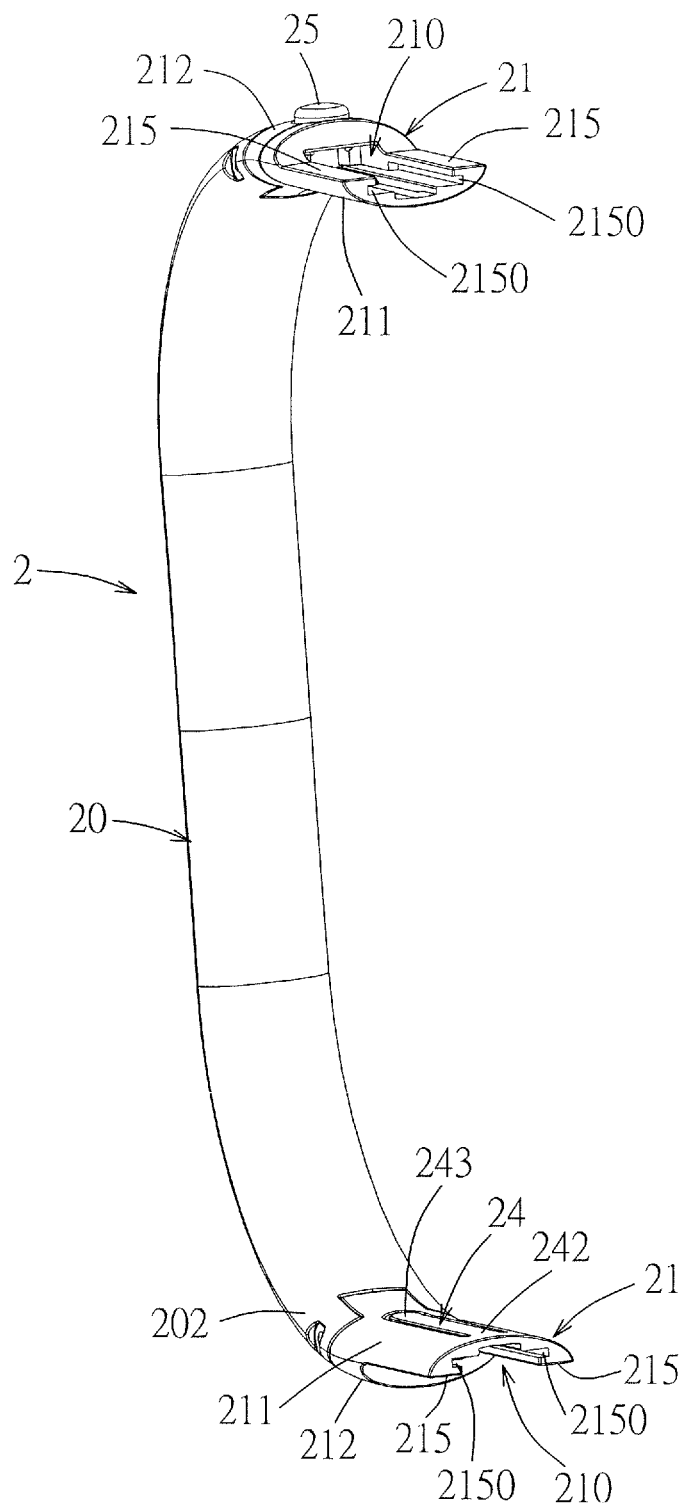
FIG. 3 is a perspective view of a safety bow assembly of the preferred embodiment.
Figure 4:
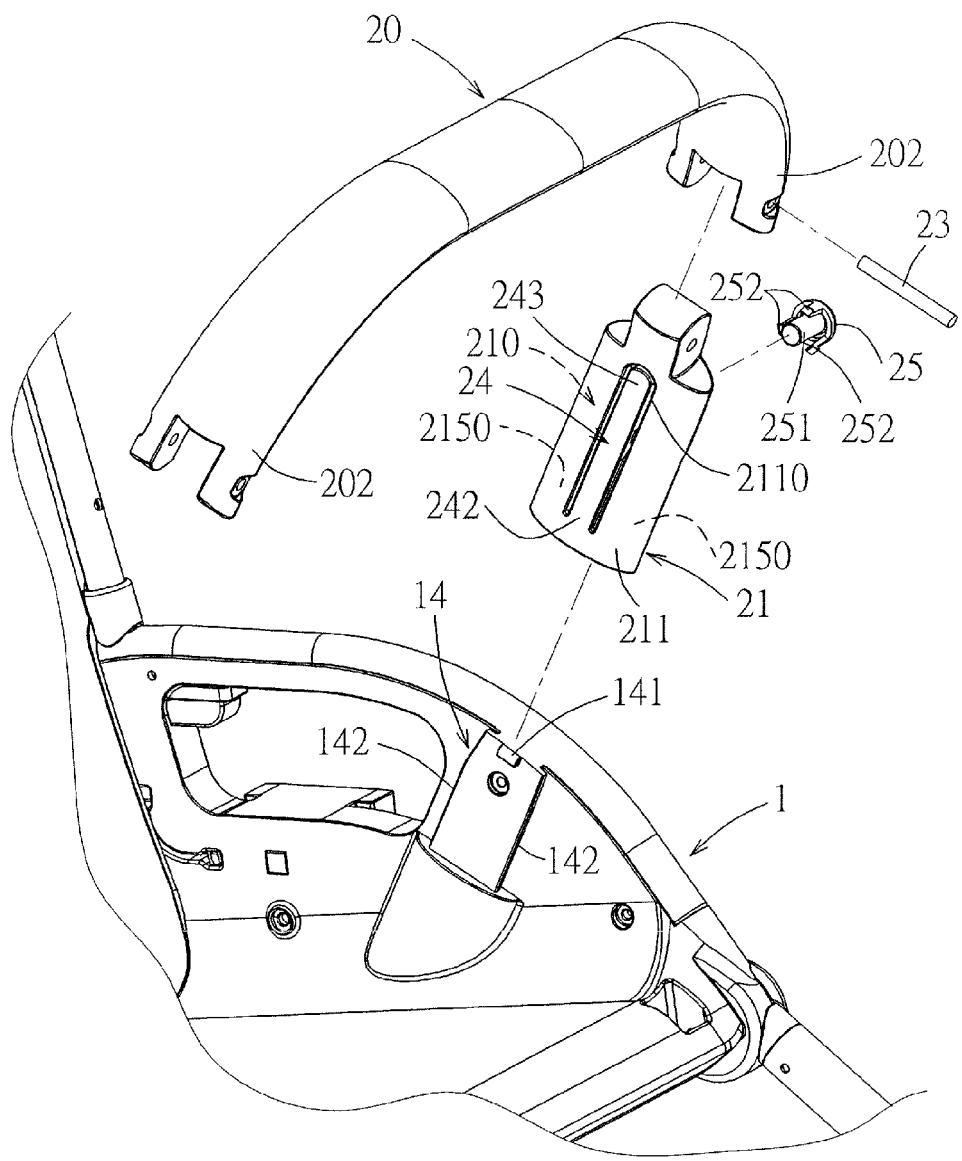
FIG. 4 is a fragmentary exploded perspective view of the preferred embodiment.

FIGS. 1 to 5 illustrate the preferred embodiment of a child seat according to the present invention. The child seat includes a seat body 1 and a safety bow assembly 2 for preventing a child sitting on the seat body 1 from falling out.

The seat body 1 has first and second armrests 11, a backrest 12 connected to the first and second armrests 11, and first and second coupling parts 14 (see FIG. 2) that are opposite to each other in a transverse direction (X) and that protrude respectively from the first and second armrests 11 in the transverse direction (X) toward each other. Each of the first and second coupling parts 14 is formed with an engaging member 141.

Figure 6:
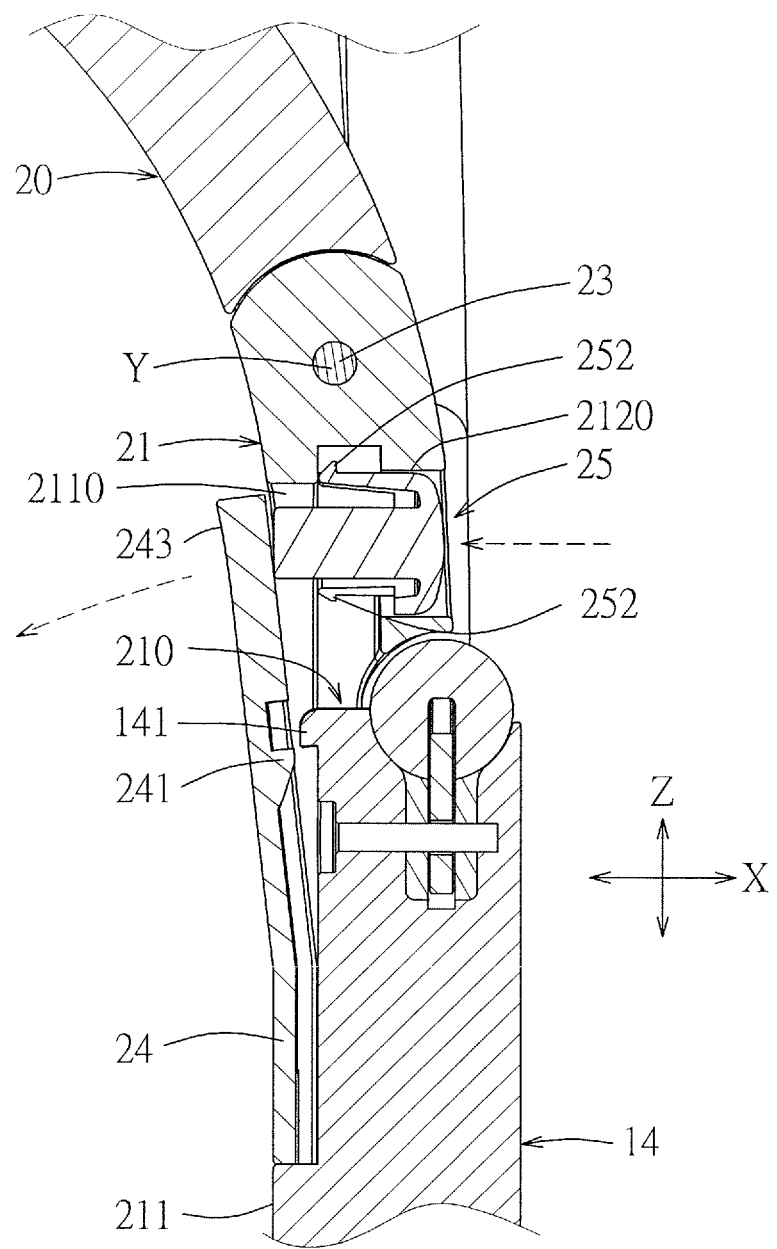
FIG. 6 is a fragmentary sectional view illustrating another state where the engaging lever of the preferred embodiment is disposed at a second position.
Figure 7:
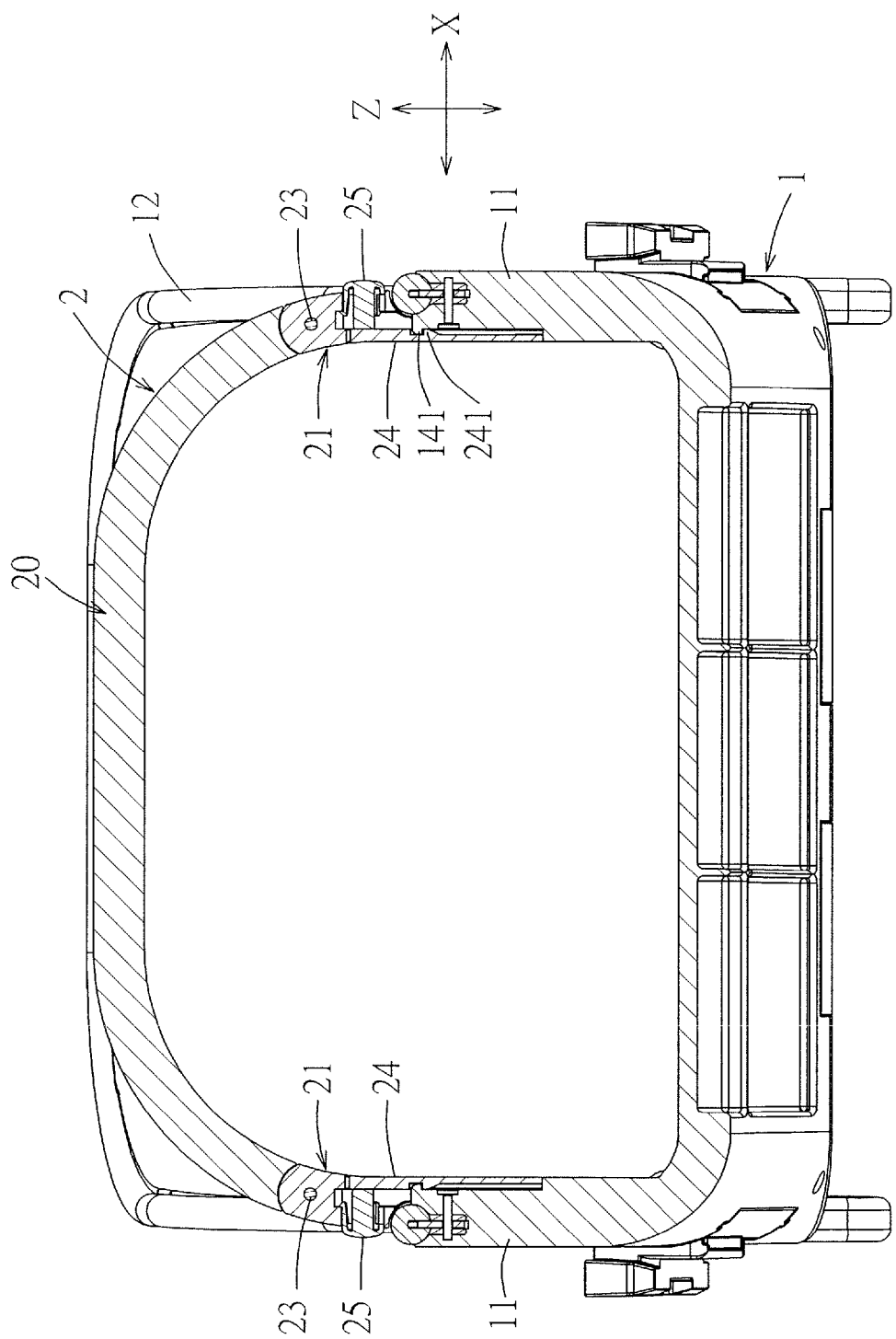
FIG. 7 is a sectional view illustrating a restricting state where the safety bow assembly is connected to first and second coupling parts of the preferred embodiment.
Figure 8:
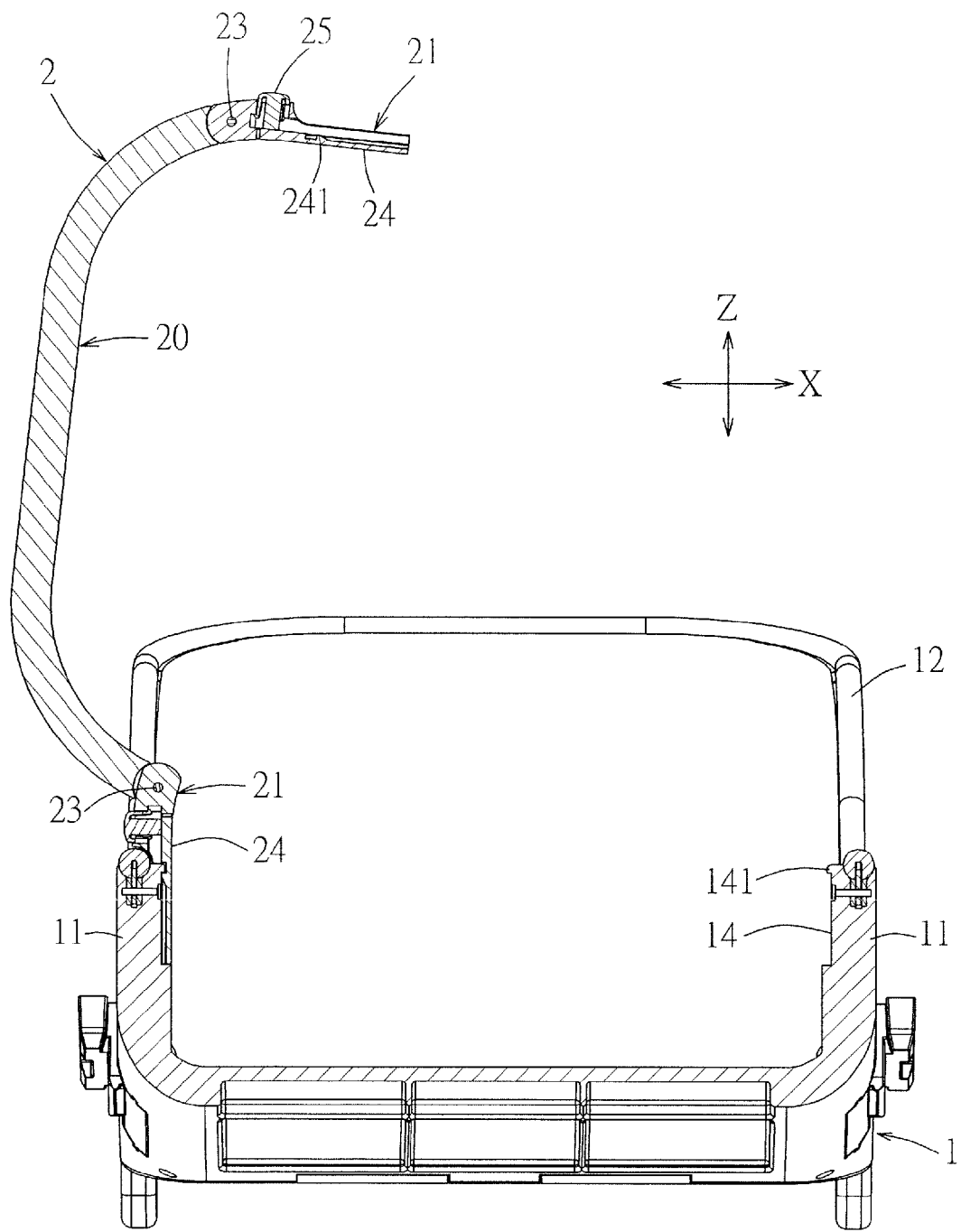
FIG. 8 is a sectional view illustrating an unrestricting state where the safety bow assembly is disconnected and rotated away from one of the first and second coupling parts of the preferred embodiment.

The safety bow assembly 2 includes a bow body 20, first and second connecting parts 21, two engaging levers 24, and two pressible buttons 25 (only one is seen in each of FIGS. 1 to 5), and is operable between a restricting state (see FIG. 7) and an unrestricting state (see FIG. 8). The bow body 20 has opposite first and second ends 202 that are opposite to each other in the transverse direction (X) when the safety bow assembly is in the restricting state. The first and second connecting parts 21 are detachably and respectively connected to the first and second coupling parts 14 and are respectively pivoted to the first and second ends 202 of the bow body 20 through pivot pins 23 so as to be rotatable relative to the bow body 20 about first and second axes (Y), respectively. The first and second axes (Y) are parallel to each other and are perpendicular to the transverse direction (X). Each of the first and second connecting parts 21 defines an accommodating space 210 and has first and second side walls 211, 212 that are opposite to each other in the transverse direction (X) when the safety bow assembly is in the restricting state. The first side wall 211 is formed with an opening 2110 that is in spatial communication with the corresponding accommodating space 210. The first and second coupling parts 14 are detachably and respectively received in the accommodating spaces 210 in the first and second connecting parts 21 so as to restrict movement of the first and second connecting parts 21 in the transverse direction (X) and in a direction parallel to the first and second axes (Y). The first and second connecting parts 21 are respectively slidable relative to the first and second coupling parts 14 in an insertion direction (Z) that is perpendicular to the transverse direction (X) and the first and second axes (Y). The engaging levers 24 are connected movably and respectively to the first side walls 211 of the first and second connecting parts 21. The pressible buttons 25 are mounted movably and respectively to the second side walls 212 of the first and second connecting parts 21. Each engaging lever 24 extends from a periphery of the opening 2110 into the opening 2110, has a free end 243, is formed with an engaging element 241 facing the corresponding accommodating space 210, and is resiliently bendable so as to be movable relative to the corresponding first side wall 211 between a first position (see FIG. 5), in which the free end 243 of the engaging lever 24 is disposed in the opening 2110 and in which the engaging element 241 engages releasably the engaging member 141 of a respective one of the first and second coupling parts 14, thereby preventing movement of the respective one of the first and second connecting parts 21 relative to the respective one of the first and second coupling parts 14 in the insertion direction (Z), and a second position (see FIG. 6), in which the free end 243 of the engaging lever 24 is disposed outwardly of the opening 2110 and in which the engaging element 241 is disengaged from the engaging member 141 of the respective one of the first and second coupling parts 14, thereby permitting movement of the respective one of the first and second connecting parts 21 relative to the respective one of the first and second coupling parts 14 in the insertion direction (Z).

Each of the first and second connecting parts 21 further has two opposite flap walls 215 (see FIG. 3) that extend from two opposite sides of the corresponding first side wall 21, respectively. Each of the flap walls 215 cooperates with the corresponding first side wall 211 to define an insertion slot 2150 within the accommodating space 210. The insertion slots 2150 defined by the first side wall 211 and the flap walls 215 receive slidably, fittingly and respectively two opposite sides 142 (see FIG. 4) of the respective one of the first and second coupling parts 14, thereby permitting the first and second coupling parts 14 to restrict movement of the first and second connecting parts 21 in the transverse direction (X) and in the direction parallel to the first and second axes (Y).

Each first side wall 211 and the respective engaging lever 24 constitute an integrally formed single piece, and each engaging lever 24 further has a connecting end 242 that is integrally connected to the periphery of the opening 2110 in the corresponding first side wall 211 so as to be resilient. Each engaging lever 24 cooperates with the corresponding first side wall 211 to confine one side of the corresponding accommodating space 210.

The engaging element 241 of each engaging lever 24 is disposed between the connecting end 242 and the free end 243 of the engaging lever 24, and engages the engaging member 141 of the respective one of the first and second coupling parts 14 in a snap-fit engaging manner.

Figure 5:
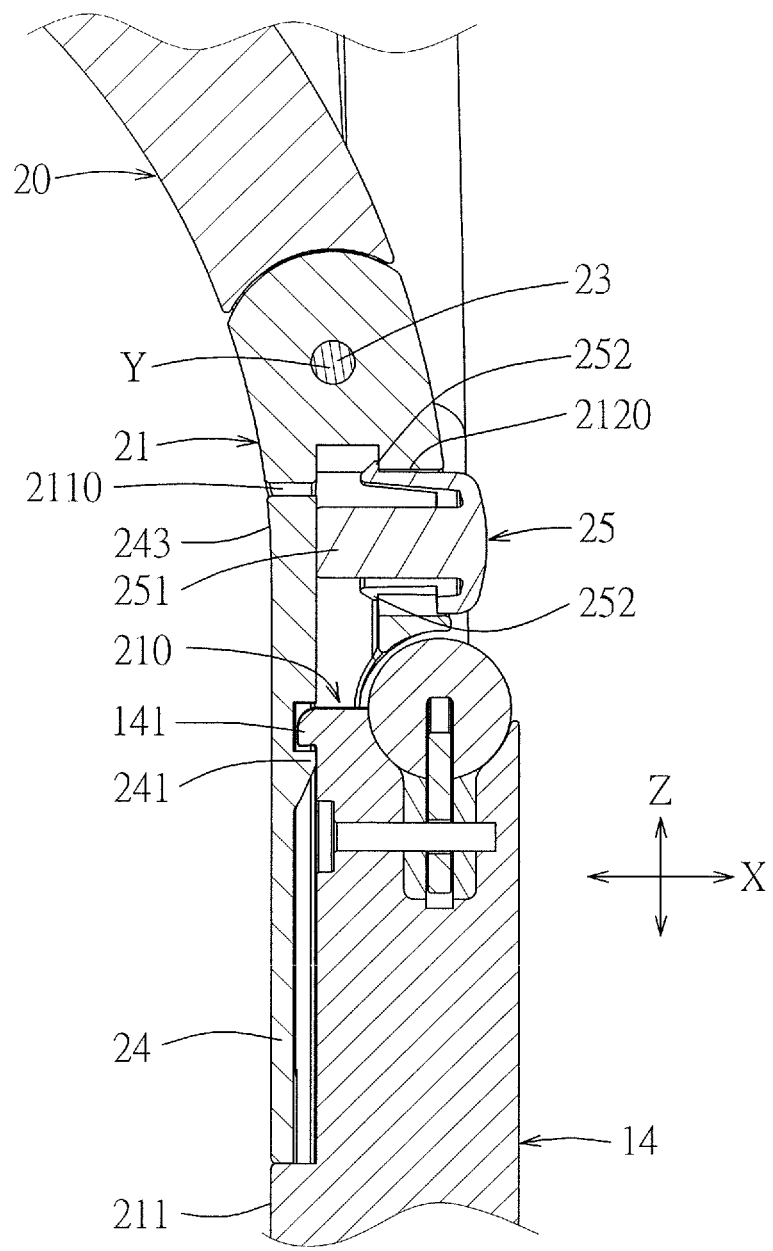
FIG. 5 is a fragmentary sectional view illustrating a state where an engaging lever of the preferred embodiment is disposed at a first position.

The second side wall 212 of each of the first and second connecting parts 21 is formed with a mounting hole 2120 (see FIG. 5). Each pressible button 25 extends through the mounting hole 2120 in the second side wall 212 of a respective one of the first and second connecting parts 21 into the corresponding accommodating space 210 to abut against the free end 243 of the corresponding engaging lever 24, and is pressible to push and bend the free end 243 of the corresponding engaging lever 24 to move away from the opening 2110 in the corresponding first side wall 211. Each pressible button 25 has a cylindrical portion 251 (see FIG. 5) that abuts against the free end 243 of the corresponding engaging lever 24, and a plurality of hooked portions 252 that extend from and that are disposed around the cylindrical portion 251 and that engage a periphery of the mounting hole 2120 in a snap-fit engaging manner.

The bow body 20 is slightly flexible or deformable so as to facilitate removal of one of the first and second connecting parts 21 from the respective one of the first and second coupling parts 14 while the other of the first and second connecting parts 21 still engages the respective one of the first and second coupling parts 14. In addition to the deformable nature of the bow body 20, since the first and second connecting parts 21 are pivoted to the first and second ends 202 of the bow body 20, during movement of one of the first and second connecting parts 21 away from the respective one of the first and second coupling parts 14 in the insertion direction (Z), rotations of the first and second connecting parts 21 relative to the bow body 20 about the first and second axes (Y), respectively, also contribute in facilitating the removal of said one of the first and second connecting parts 21 from the respective one of the first and second coupling parts 14. Moreover, these pivot joints also help reduce the extent of deformation of the bow body 20 during the removal operation.

In operation, when one of the first and second connecting parts 21 is to be disconnected from the respective one of the first and second coupling parts 14 to permit movement of the safety bow assembly 2 from the restricting state (see FIG. 7) to the unrestricting state (see FIG. 8) for removal of a child (not shown) sitting on the seat body 1, the corresponding one of the buttons 25 is pushed to disengage the corresponding engaging lever 24 from the corresponding one of the first and second coupling parts 14 (see FIG. 6), followed by sliding said one of the first and second connecting parts 21 in the insertion direction (Z) to remove it from the corresponding one of the first and second coupling parts 14 and subsequently rotating the bow body 20 relative to the seat body 1 away from the corresponding one of the first and second coupling parts 14 to the unrestricting position, thereby permitting removal of the child from the seat body 1. Since each engaging lever 24 is resilient, The same can be restored to its original position when the corresponding button 25 is released from pressing.

By connecting pivotally the first and second connecting parts 21 to the bow body 20 and engaging releasably the engaging levers 24 with the first and second coupling parts 14 of the child seat of this invention, the aforesaid drawback associated with the prior art can be eliminated.

While the present invention has been described in connection with what is considered the most practical and preferred embodiment, it is understood that this invention is not limited to the disclosed embodiment but is intended to cover various arrangements included within the spirit and scope of the broadest interpretation and equivalent arrangements.

What is claimed is:

1. A safety bow assembly for a child seat having first and second coupling parts, said safety bow assembly comprising:
    a bow body that has opposite first and second ends;
    first and second connecting parts that are adapted to be respectively connected to the first and second coupling parts of the child seat, said first connecting part defining an accommodating space and having a first side wall, said accommodating space being adapted to receive removably the first coupling part therein, said first side wall being formed with an opening that is in spatial communication with said accommodating space;
    an engaging lever that extends from a periphery of said opening into said opening, that has a free end, that is formed with an engaging element facing said accommodating space, and that is resiliently bendable so as to be movable relative to said first side wall between a first position, in which said free end of said engaging lever is disposed in said opening and in which said engaging element is adapted to engage releasably the first coupling part, and a second position, in which said free end of said engaging lever is disposed outwardly of said opening and in which said engaging element is adapted to be disengaged from the first coupling part, such that the connection between said first connecting part and the first coupling part is detachable; and
    a pressible button, said first connecting part further having a second side wall that is disposed opposite to said first side wall and that is formed with a mounting hole, said pressible button being mounted movably on said second side wall, extending through said mounting hole into said accommodating space to abut against said free end of said engaging lever, and being pressible to push said free end to move said free end away from said opening.

2. The safety bow assembly of claim 1, wherein said first and second connecting parts are respectively pivoted to said first and second ends of said bow body so as to be rotatable relative to said bow body.

3. The safety bow assembly of claim 1, wherein said first side wall and said engaging lever constitute an integrally formed single piece.

4. The safety bow assembly of claim 1, wherein said engaging element is adapted to engage the first coupling part in a snap-fit engaging manner.

5. A safety bow assembly for a child seat having first and second coupling parts, said safety bow assembly comprising;
    a bow body that has opposite first and second ends;
    first and second connecting parts that are adapted to be respectively connected to the first and second coupling parts of the child seat, said first connecting part defining an accommodating space and having a first side wall, said accommodating space being adapted to receive removably the first coupling part therein, said first side wall being formed with an opening that is in spatial communication with said accommodating space; and
    an engaging lever that extends from a periphery of said opening into said opening, that has a free end, that is formed with an engaging element facing said accommodating space and thatis resiliently bendable so as to be movable relative to said first side wall between a first position, in which said free end of said engaging lever is disposed in said opening and in which said engaging element is adapted to engage releasably the first coupling part, and a second position, in which said free end of said engaging lever is disposed outwardly of said opening and in which said engaging element is adapted to be disengaged from the first coupling part, such that the connection between said first connecting part and the first coupling part is detachable;
    wherein said first connecting part further has two opposite flap walls that respectively extend from two opposite sides of said first side wall, each of said flap was cooperating with said first side wall to define an insertion slot within said accommodating space, said insertion slots defined by said first side wall and said flap walls being adapted to receive slidably, fittingly and respectively two opposite sides of the first coupling part.

6. The safety bow assembly of claim 5, wherein said first and second connecting parts are respectively pivoted to said first and second ends of said bow body so as to be rotatable relative to said bow body.

7. The safety bow assembly of claim 5, wherein said first side wall and said engaging lever constitute an integrally formed single piece.

8. The safety bow assembly of claim 5, wherein said engaging element is adapted to engage the first coupling part in a snap-fit engaging manner.

9. A child seat comprising:
    a seat body having first and second armrests and first and second coupling parts which protrude respectively from said first and second armrests and which are opposite to each other in a transverse direction; and
    a safety bow assembly including
    a bow body that has opposite first and second ends,
    first and second connecting parts that are respectively connected to said first and second coupling parts of said seat body, said first and second connecting parts being respectively pivoted to said first and second ends of said bow body so as to be rotatable relative to said bow body, said first connecting part defining an accommodating space and having a first side wall, said accommodating space receiving removably said first coupling part therein, said first side wall being formed with an opening that is in spatial communication with said accommodating space,
    an engaging lever that extends from a periphery of said opening into said opening, that has a free end, that is formed with an engaging element facing said accommodating space, and that is resiliently bendable so as to be movable relative to said first side wall between a first position, in which said free end of said engaging lever is disposed in said opening and in which said engaging element engages releasably said first coupling part, and a second position, in which said free end of said engaging lever is disposed outwardly of said opening and in which said engaging element is disengaged from said first coupling part, such that the connection between said first connecting part and said first coupling part is detachable; and
    a pressible button, said first connecting part further having a second side wall that is disposed opposite to said first side wall and that is formed with a mounting hole, said pressible button being mounted movably on said second side wall, extending through said mounting hole into said accommodating space to abut against said free end of said engaging lever, and being pressible to push said free end to move said free end away from said opening.

* * * * *